United States Patent
Amadril et al.

(10) Patent No.: US 8,057,112 B2
(45) Date of Patent: Nov. 15, 2011

(54) CAMERA MULTI-MOUNT

(75) Inventors: Richard Todd Amadril, West Hollywood, CA (US); James William Favazzo, West Hills, CA (US); Mark Christopher Dodd, Simi Valley, CA (US)

(73) Assignee: Panavision International, L.P., Woodland Hills, CA (US)

( * ) Notice: Subject to any disclaimer, the term of this patent is extended or adjusted under 35 U.S.C. 154(b) by 125 days.

(21) Appl. No.: 12/247,914

(22) Filed: Oct. 8, 2008

(65) Prior Publication Data
US 2009/0097840 A1    Apr. 16, 2009

Related U.S. Application Data

(60) Provisional application No. 60/978,898, filed on Oct. 10, 2007.

(51) Int. Cl.
*G03B 17/00* (2006.01)
(52) U.S. Cl. ............ 396/428; 352/243; 248/123.2; 348/373
(58) Field of Classification Search ............ 352/243; 396/428; 248/123.2; 348/373
See application file for complete search history.

(56) References Cited

U.S. PATENT DOCUMENTS

| | | | |
|---|---|---|---|
| 4,187,020 A | 2/1980 | Ishii et al. | |
| 4,474,439 A * | 10/1984 | Brown | 352/243 |
| 4,907,768 A * | 3/1990 | Masseron et al. | 248/123.11 |
| 4,943,019 A | 7/1990 | Mester | |
| 5,177,516 A * | 1/1993 | Fitz et al. | 396/428 |
| 5,737,657 A | 4/1998 | Paddock et al. | |
| 5,940,645 A * | 8/1999 | Bonin | 396/428 |
| 6,086,207 A * | 7/2000 | Chapman | 352/243 |
| 6,626,412 B1 | 9/2003 | Lindsay | |
| 2002/0001471 A1 | 1/2002 | Chapman | |

(Continued)

FOREIGN PATENT DOCUMENTS

WO    WO-2009/048946 A1    4/2009

(Continued)

OTHER PUBLICATIONS

International Search Report and Written Opinion for PCT Application No. PCT/US08/79197, mailed Dec. 5, 2008 (9 pages).

(Continued)

*Primary Examiner* — Rodney Fuller
*Assistant Examiner* — Fang-Chi Chang
(74) *Attorney, Agent, or Firm* — Connolly Bove Lodge & Hutz LLP (57) ABSTRACT

A multi-mount apparatus for devices such as camera heads or lights on the end of a crane arm is disclosed. The multi-mount can include two substantially parallel side plates connected together with internal support members. A top mounting plate can be rotatably attached to the multi-mount at a top pivot point on the side plates. The multi-mount contains a leveling head, which can include a motor that drives a worm gear engaged with a moon gear. A bottom mounting plate can be attached to the moon gear, which is rotatably attached to the multi-mount at a bottom pivot point on the side plates. A motor drives a moon gear to rotate and maintain the bottom mounting plate at a desired orientation. In some embodiments, one or more push/pull rods rotatably attached to the bottom and top mounting plates also cause the top mounting plate to be maintained at the same orientation as the bottom mounting plate.

18 Claims, 10 Drawing Sheets

U.S. PATENT DOCUMENTS

| | | | |
|---|---|---|---|
| 2003/0185668 A1* | 10/2003 | Uffelman | 415/55.4 |
| 2004/0223753 A1* | 11/2004 | Gale | 396/421 |
| 2005/0007553 A1 | 1/2005 | Romanoff et al. | |
| 2005/0167558 A1 | 8/2005 | Smith | |
| 2005/0169625 A1* | 8/2005 | Smith | 396/422 |
| 2005/0231634 A1 | 10/2005 | Chapman | |
| 2007/0108791 A1* | 5/2007 | Okninski | 296/97.12 |

FOREIGN PATENT DOCUMENTS

| | | |
|---|---|---|
| WO | WO-2009/048950 A1 | 4/2009 |

OTHER PUBLICATIONS

PCT Search Report mailed Dec. 24, 2008 for PCT/US08/79201.

* cited by examiner

CAMERA MULTI-MOUNT

CROSS REFERENCE TO RELATED APPLICATION

The present invention claims the benefit under 35 USC 119(e) of U.S. provisional patent application Ser. No. 60/978, 898 filed Oct. 10, 2007, the contents of which are incorporated by reference herein.

FIELD OF THE INVENTION

The field of the present invention relates generally to camera positioning systems, and more particularly, to providing multiple leveling plates at the distal end of a crane arm to facilitate the mounting of multiple cameras, lights and the like at the end of the crane arm, or to enable the efficient changing of camera mounting locations (e.g. from "under-slung" or under-mounted to top-mounted) without having to change mounting fixtures.

BACKGROUND OF THE INVENTION

Traditionally, camera cranes and dollies have been employed to assist in the positioning of cameras at defined locations and orientations to capture the desired shot. (For the purpose of this application a camera shall refer to any type of device capable of recording or transmitting either still or moving images including but not limited to conventional cinema cameras, conventional still cameras, television cameras, videotape cameras, digital cameras, CCD cameras, or the like.) Conventional camera cranes are generally comprised of a crane arm (or "jib"), a support structure to which the crane arm is mounted, and a "leveling head" affixed to the distal end of the crane arm. Typically, the crane arm is pivotally coupled to the support structure in a manner that facilitates the rotation of the crane arm about a vertical and a horizontal axis. The rotation of the crane arm about the vertical axis is generally referred to as crane arm "swing," while the rotation of the crane arm about the horizontal axis is generally referred to as crane arm "boom." In addition to the crane arm being capable of swing and boom, conventional crane arms are often constructed to be adjustable in length, so that the crane arm can "telescope" from one length to another. Thus, the distal end of the crane arm (i.e., the end affixed to the leveling head) is capable of translating through a semi-sphere, the diameter of which is controlled by the overall length of the crane arm, which can be adjusted by telescoping the crane arm. Moreover, camera cranes are often mounted on a rolling platform that is generally referred to as a "dolly."

The leveling head is a mechanism that is typically employed to connect the camera crane arm to a camera mounting structure referred to as a "camera head." Leveling heads are generally comprised of a leveling mechanism that functions to maintain a "leveling plate" parallel to a defined plane in response to changes in the boom of the crane arm. As used in this application a "leveling plate" is a defined member of the leveling head that is adapted to being coupled to the camera head. An example of such a leveling head is disclosed in U.S. Pat. No. 4,943,019, which is hereby incorporated herein by reference in its entirety for all purposes.

A camera head (a.k.a. remote head) may then be mounted to the leveling head. Conventional camera heads, in addition to providing a support structure to securely mount the camera, are typically adapted to rotate about a vertical axis (i.e., panning) and a horizontal axis (i.e., tilting) relative to the leveling plate. To facilitate the panning and tilting of the camera head, two independently actuated motor mechanisms are usually employed. The first is often referred to as a "camera pan motor," which as the name suggests facilitates the panning of the camera head (i.e., the rotation of the camera head about the vertical axis). The second is often referred to as a "camera tilt motor," which also as the name suggests facilitates the tilting of the camera head (i.e., the rotation of the camera head about the horizontal axis).

In operation, the boom (i.e., the rotation of the crane arm about a horizontal axis), swing (i.e., the rotation of the crane arm about a vertical axis), telescope (i.e., the length of the crane arm), and the movement of the rolling platform or dolly are typically controlled manually by one or more operators or "grips." The adjustments of the leveling head are usually automated to respond to the change in the boom so as to maintain the camera head generally level to the horizontal plane. The "pan" and "tilt" of the camera head together with the focus of the camera, on the other hand, have been traditionally controlled remotely (usually via electrical circuitry) by another operator, referred to as the "camera-operator," who is responsible for the composition of the shot (i.e., the field of view and focus of the camera).

Figure 1:
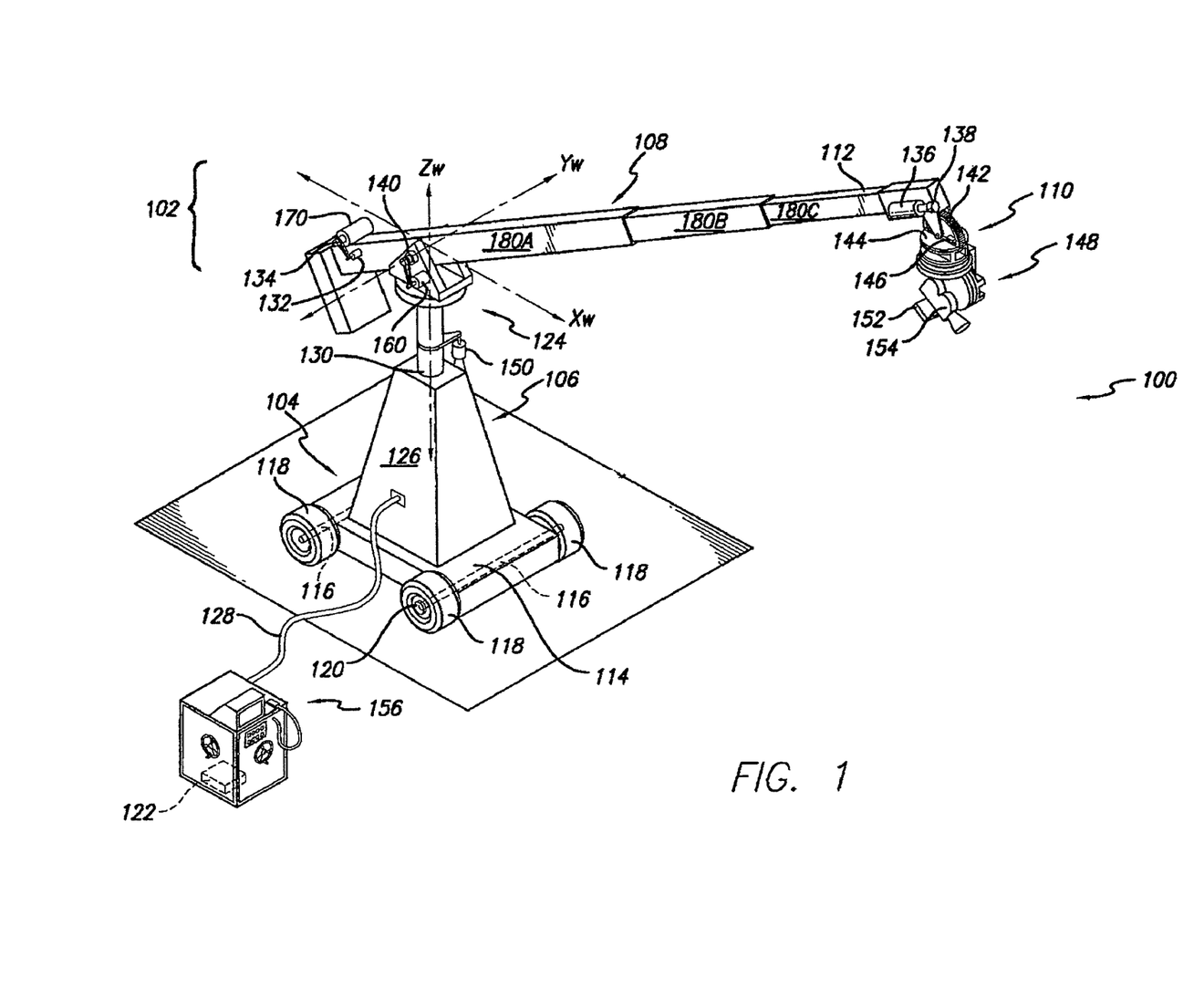
FIG. 1 is a perspective view of an exemplary conventional camera positioning system that can be used with embodiments of the invention.

FIG. 1 is a perspective view of an exemplary conventional camera positioning system 100. Shown in FIG. 1 is camera support structure 102 capable of movement with multiple degrees of freedom. Camera support structure 102 can include movable platform or dolly 104, crane arm support structure 106 mounted on the dolly, telescoping crane arm 108 pivotally mounted to the crane arm support structure, and leveling head 110 mounted to distal end 112 of the crane arm. Camera head 148 can be mounted to leveling head 110, and can include camera mounting bracket 152 upon which camera 154 can be mounted.

Dolly 106 can include base structure 114 to which crane arm support structure 106 is mounted. To facilitate movement of dolly 104, base structure 114 can include two axles 116 (shown in phantom), with each axle having two wheels 118 mounted thereto. Dolly sensing device 120 can be employed to monitor the movement of dolly 104 and transmit, via suitable communication means, data relating to the movement of the dolly to processing system 122 (shown in phantom in FIG. 1). For the purposes of this description, "suitable communications means" can include electrical, electro-magnetic, optical, mechanical or any other means suitable for transferring data between the sensing device and the processing system employed. Also for the purposes of this description, "movement" can include the act, process, or result of moving.

Crane arm 108 can mounted in a suitable fashion to crane arm support structure 106 via coupling mechanism 124. Coupling mechanism 124 can facilitate, via rotatable support shaft 130, the rotation of crane arm 108 about a vertical axis, which in FIG. 1 corresponds with the axis called out as $Z_w$, so as to permit changes in the swing angle of the crane arm. In addition, coupling mechanism 124 can facilitate, via horizontal pivot 140, the rotation of crane arm 108 about a horizontal axis, which in FIG. 1 corresponds with the axis called out as $Y_w$, so as to permit changes in the boom angle of the crane arm.

Crane arm swing sensing device 150 can be employed to monitor the swing (i.e., the rotation of the crane arm about the vertical axis) of the crane arm and transmit, via suitable communication means, data relating to crane arm swing to processing system 122 located in camera operator control module 156. Similarly, crane arm boom sensing device 160 can be employed to monitor the boom (i.e., the rotation of the crane arm about the horizontal axis) of the crane arm and transmit via suitable communication means data relating to the crane arm boom to processing system 122.

In exemplary system 100 illustrated in FIG. 1, swing and boom sensing devices 150, 160 can individually comprise a rotary encoder such as part number 8-5800-2146-5000 manufactured by Fritz Kubler GMBH of Germany. As illustrated in FIG. 1, rotary encoder swing sensing device 150 employed to monitor the swing of the crane arm 108 can be fitted to housing 126 of support structure 102 and monitor via a toothed belt the rotation of support shaft 130 relative to the housing. Similarly, rotary encoder boom sensing device 160 employed to monitor the crane arm boom can be mounted to the side wall of coupling mechanism 124 and monitor via a toothed belt the relative rotation of horizontal pivot 140. Each of encoder sensing devices 150, 160 can be adapted to transmit data relating to their respective monitored stimuli to processing system 122 via electrical communications transmitted through electrical cable 128.

Telescoping crane arm 108 can include nested sections 180A, 180B, and 180C configured so that each inner section is supported within the outer adjacent section. Extension of crane arm inner sections 180B, 180C can be controlled by means of crane arm telescope motor 170 mounted at the end of crane arm 108 opposite leveling head 110. Crane arm telescope motor 170 can supply drive via a cable and pulley mechanism such as that disclosed in U.S. Pat. No. 4,939,019, already incorporated by reference, so as to facilitate the extension and retraction of crane arm sections 180B, 180C.

A crane arm telescope sensing device 132 can be employed to monitor the telescope (e.g., length) of crane arm 108 and transmit, via suitable communication means, data relating to the crane arm telescope to processing system 122. In exemplary system 100 illustrated in FIG. 1, crane arm telescope sensing device 132 can include a rotary encoder, such as part number BDE 05.05A500 manufactured by Baumer Electric of Switzerland. As illustrated in FIG. 1, encoder telescope sensing device 132 can be mounted to the wall of crane arm section 180A and can be adapted to monitor via a toothed belt the rotation of drive shaft 134 of crane arm motor 170. Encoder telescope sensing device 132 can also be adapted to transmit data relating to the rotation of drive shaft 134 to processing system 122 via electrical communications transmitted through electrical cable 128.

Leveling head 110 can be removably coupled to distal end 122 of the innermost crane arm section 180C. Leveling head motor 136 can be mounted within the housing of leveling head 110 and drive a worm gear 138 that can be adapted to engage semicircular moon gear 142, the base of which defines leveling plate 144. In some embodiments, level sensor 146, such as a mercury tilt switch, can be fitted to worm gear 142 just above leveling plate 144 and can be electrically connected to leveling head motor 136. Level sensor 146 can be configured to activate leveling head motor 136 to maintain leveling plate 144 horizontal with respect to a defined plane (e.g., horizon, ground, etc.) in response to changes in the boom of crane arm 108. It should be understood, however, that other sensors, control systems and mechanical means well-known in the art can also be used to maintain leveling plate 144 in a desired configuration.

Typically, if leveling head 110 is needed in its conventional under-mount configuration, the leveling head can be mounted directly to distal end 112 of crane arm 108 as shown in FIG. 1. However, if leveling head 110 is needed in a top-mount configuration (e.g. to enable the camera to point upward and generally have a more unobstructed upward view), a separate top-mount bracket must first be attached to distal end 112 of crane arm 108 to enable the leveling head to be mounted with its leveling plate facing upward. Similarly, if leveling head 110 is needed in a front-mount configuration, a separate front-mount bracket must first be attached to distal end 112 of crane arm 108 to enable the leveling head to be mounted with a mounting plate facing forward (i.e. facing the same direction as the crane arm). The need for these separate mounting brackets causes a significant amount of time to be wasted while changing configurations. For example, to change a camera head from an under-mount to a top-mount configuration, the camera head must first be removed from the leveling head, and the leveling head must be removed from the crane arm. A top-mount bracket must then be installed in the crane arm. The leveling head can then be installed in the top-mount bracket, and the camera head can be installed on the leveling head. All of these steps can take a lot of time, which can represent a significant expense during filming, and also hinder the crane's performance and limit its versatility.

Therefore, there is a need for a mounting bracket that can be installed at a distal end of a crane arm to provide multiple mounting locations for one or more camera heads, lights, and the like, without any of the tradeoffs or compromises to performance.

SUMMARY OF THE INVENTION

Embodiments of the invention are directed to a multi-mount apparatus for one or more devices such as remote camera heads or lights. The multi-mount is configured for attachment to the distal end of a crane arm, and can include two substantially parallel side plates connected together with internal support members. The side plates (or extensions thereof) can extend inside the crane arm for attachment to the crane arm. A top mounting plate can be rotatably attached to the multi-mount at a top pivot point on the side plates.

The multi-mount is adapted for containing a leveling head, which can include a motor that drives a worm gear engaged with a moon gear. A bottom mounting plate can be fixedly attached to the moon gear, which is rotatably attached to the multi-mount at a bottom pivot point on the side plates. When driven by leveling control signals, the motor drives the worm gear, which engages the moon gear and causes the moon gear to rotate and maintain the bottom mounting plate at a desired orientation (e.g. horizontally level). In some embodiments, one or more push/pull rods rotatably attached to the bottom mounting plate at lower rod attachments and the top mounting plate at upper rod attachments also cause the top mounting plate to be maintained at the same orientation as the bottom mounting plate. Additionally, a front mounting plate can be formed or attached to the distal end of the multi-mount to allow for front-mounting of a device such as a camera. Note that in some embodiments, the front mounting plate is decoupled from the leveling head, and thus does not maintain a particular orientation as the angle of the crane arm is changed. Instead, the front mounting plate may always point in the same direction as the crane arm.

With the multi-mount, a device such as a camera head can be moved quickly from a top mount to a bottom or front mount configuration, or vice versa, using any of the three mounting plates. Alternatively, multiple devices such as two camera heads, or a camera head and a light, can be simultaneously attached and maintained in a known orientation.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the invention are directed to a mounting bracket that can be installed at a distal end of a crane arm to provide multiple mounting locations for one or more camera heads, lights, and the like. In some embodiments, only a single drive mechanism is needed to maintain all mounting locations is desired orientations.

Although some embodiments of this invention may be described herein in terms of telescoping crane arms for cameras, it should be understood that embodiments of this invention are not so limited, but are generally applicable to both fixed and telescoping crane arms used for providing multiple mounting locations for any number of devices, such as cameras, lights, buckets and the like. Furthermore, although some of the mounting locations may be described herein as being maintained in a level orientation, it should be understood that the sensor and control mechanisms described herein can also be adapted to maintain some of the mounting locations at other orientations.

Figure 2A:
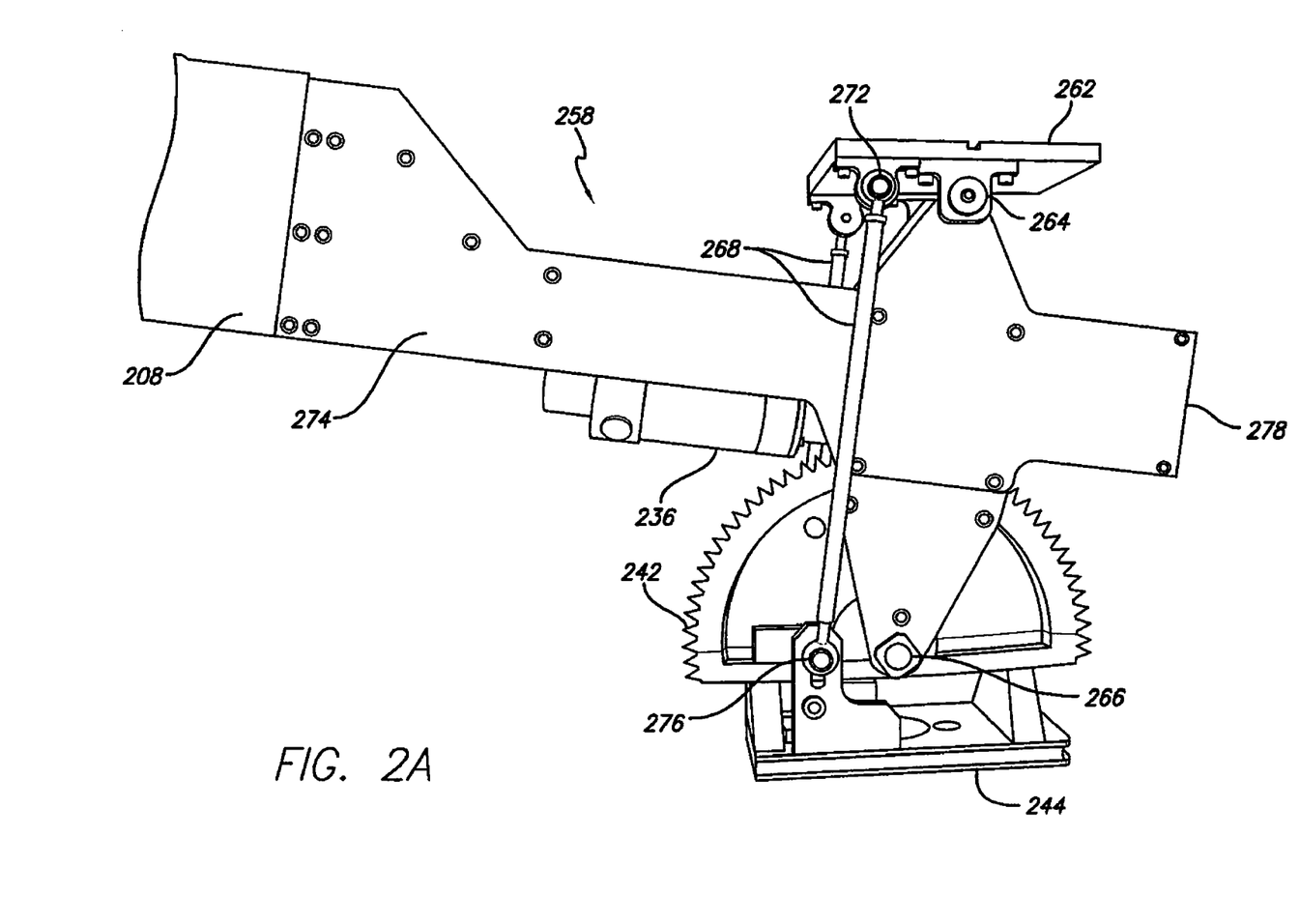
FIG. 2a illustrates an exemplary camera multi-mount according to embodiments of the invention.

FIG. 2a illustrates an exemplary camera multi-mount 258 according to embodiments of the invention. Multi-mount 258 is configured for attachment to the distal end of crane arm 208. Multi-mount 258 can include two substantially parallel side plates 274 (although only one can be seen in FIG. 2a) connected together with internal support members (not visible in FIG. 2a). In some embodiments, side plates 274 can be machined or otherwise formed from aluminum. Side plates 274 can extend inside crane arm 208 for attachment, or alternatively, separate mounting structures within side plates 274 can extend inside the crane arm. Top mounting plate 262 can be rotatably attached to multi-mount 258 at top pivot 264.

A leveling head can include motor 236 that drives a worm gear engaged with moon gear 242. Bottom mounting plate 244 can be fixedly attached to moon gear 242, which is rotatably attached to multi-mount 258 at bottom pivot 266. When driven by leveling control signals, motor 236 drives the worm gear, which engages moon gear 242 and causes the moon gear to rotate and maintain bottom mounting plate 244 at a desired orientation (e.g. horizontally level). In some embodiments, one or more push/pull rods 268 rotatably attached to bottom mounting plate 244 at lower rod attachments 276 and top mounting plate 262 at upper rod attachments 272 also cause the top mounting plate to be maintained at the same orientation as the bottom mounting plate. In other words, using one or more push/pull rods 268, a single leveling head can be used to maintain both the top and bottom mounting plates 262 and 244 at approximately the same orientation.

It should be understood, however, that the worm gear and moon gear 242 are only exemplary, and that the leveling head can include other mechanisms that convert the rotational motion of motor 236 to the rotational motion of the moon gear. In addition, moon gear 242 can be replaced with some other mechanism or linear translation member such as a ballscrew or rack and pinion driver or the like that converts the rotational motion of motor 236 to linear motion (the linear motion of push/pull rods 268). Furthermore, although FIG. 2a shows the leveling head directly coupled to bottom mounting plate 244 and coupled to top mounting plate 262 through a linear translation member (push/pull rods 268), in other embodiments to leveling head can instead be directly coupled to top mounting plate 262 and coupled to bottom mounting plate 244 through a linear translation member.

In further alternative embodiments, each of top mounting plate 262 and bottom mounting plate 244 can be maintained at about the same orientation, or even at different orientations, using separate leveling heads for each plate. Additionally, front mounting plate 278 can be formed or attached to the distal end of multi-mount 258 to allow for front-mounting of a device such as a camera. Note that in the embodiment of FIG. 2a, front mounting plate 278 is de-coupled from the leveling head, and thus does not maintain a particular orientation as the angle of crane arm 208 is changed. Instead, in the embodiment of FIG. 2a, front mounting plate 278 always points in the same direction as crane arm 208.

With multi-mount 258 as shown in FIG. 2a, a device such as a camera head can be moved quickly from a top mount to a bottom or front mount configuration, or vice versa, using any of the three mounting plates. Alternatively, multiple devices such as two camera heads, or a camera head and a light, can be simultaneously attached and maintained in a known orientation. Other devices that can be mounted include, but are not limited to, weather protection, wireless transmitters, and other cinematography-related equipment.

Figure 2B:
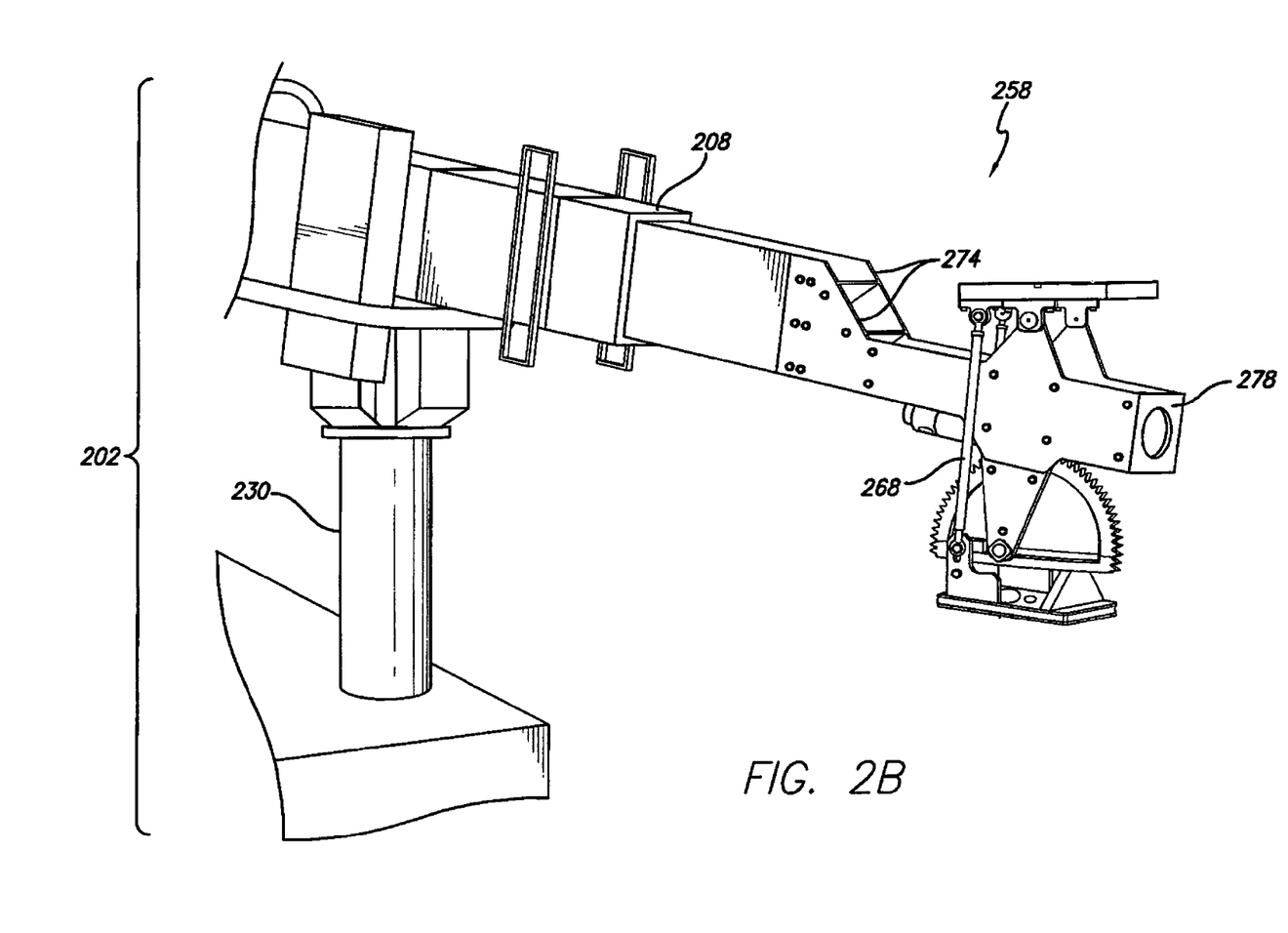
FIG. 2b illustrates a different view of the exemplary camera multi-mount of FIG. 2a according to embodiments of the invention.

FIG. 2b illustrates a different view of the exemplary camera multi-mount 258 of FIG. 2a according to embodiments of the invention, including a partial view of support structure 202 including support shaft 230 and crane arm 208. FIG. 2b shows front mounting plate 278 formed in or attached to the distal end of side plates 274.

Figure 2C:
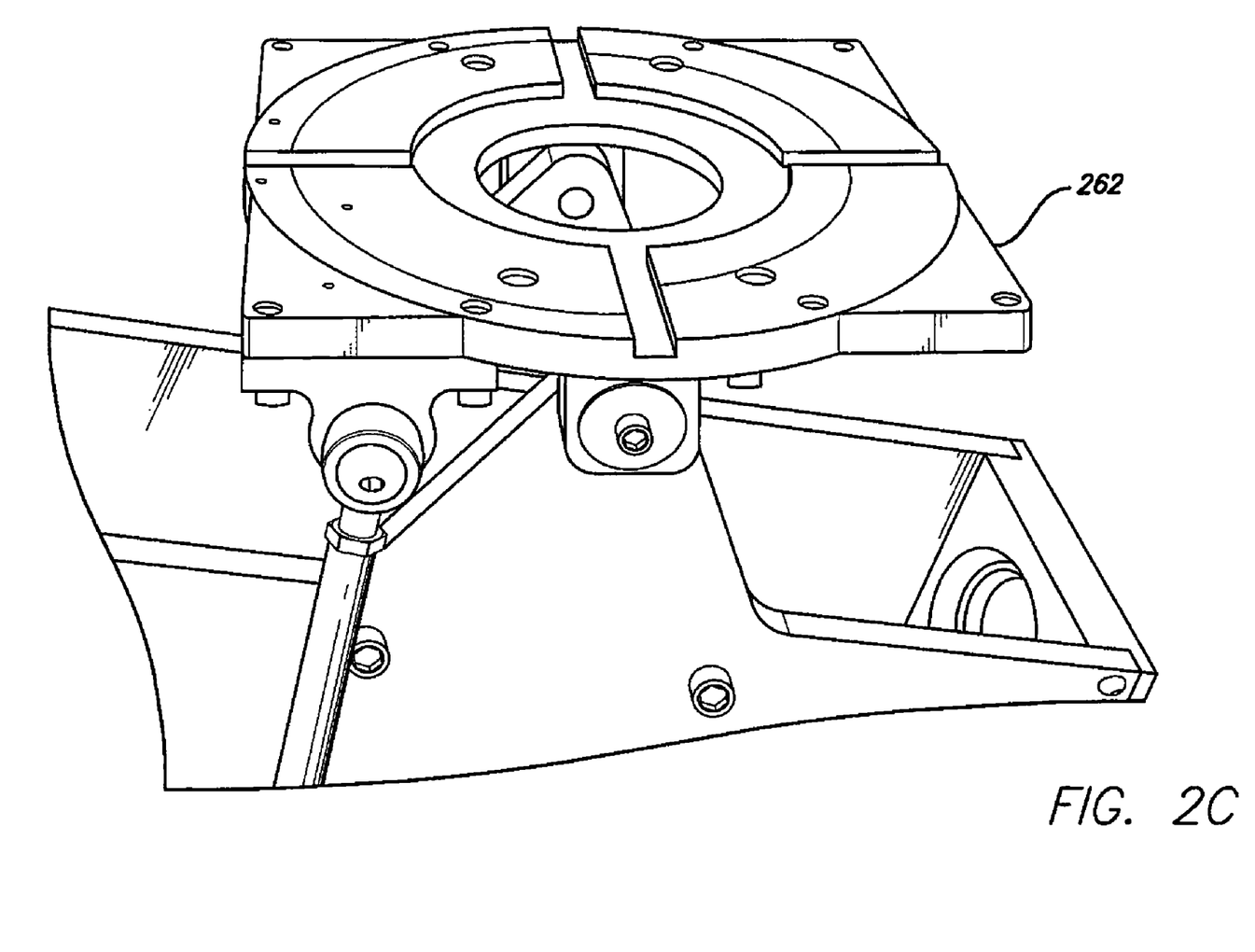
FIG. 2c illustrates an exemplary top mounting plate according to embodiments of the invention.

FIG. 2c illustrates an exemplary top mounting plate 262 according to embodiments of the invention. It should be understood that the pattern in top mounting plate 262 as shown in FIG. 2c is merely exemplary, and can be machined or otherwise formed in any shape to match the mounting patterns of other devices such as remote camera heads. In addition, top mounting plate 262 can also be a frame or plate that allows a variety of different adapter plates, each designed for a different device, to be attached to the frame.

Figure 2D:
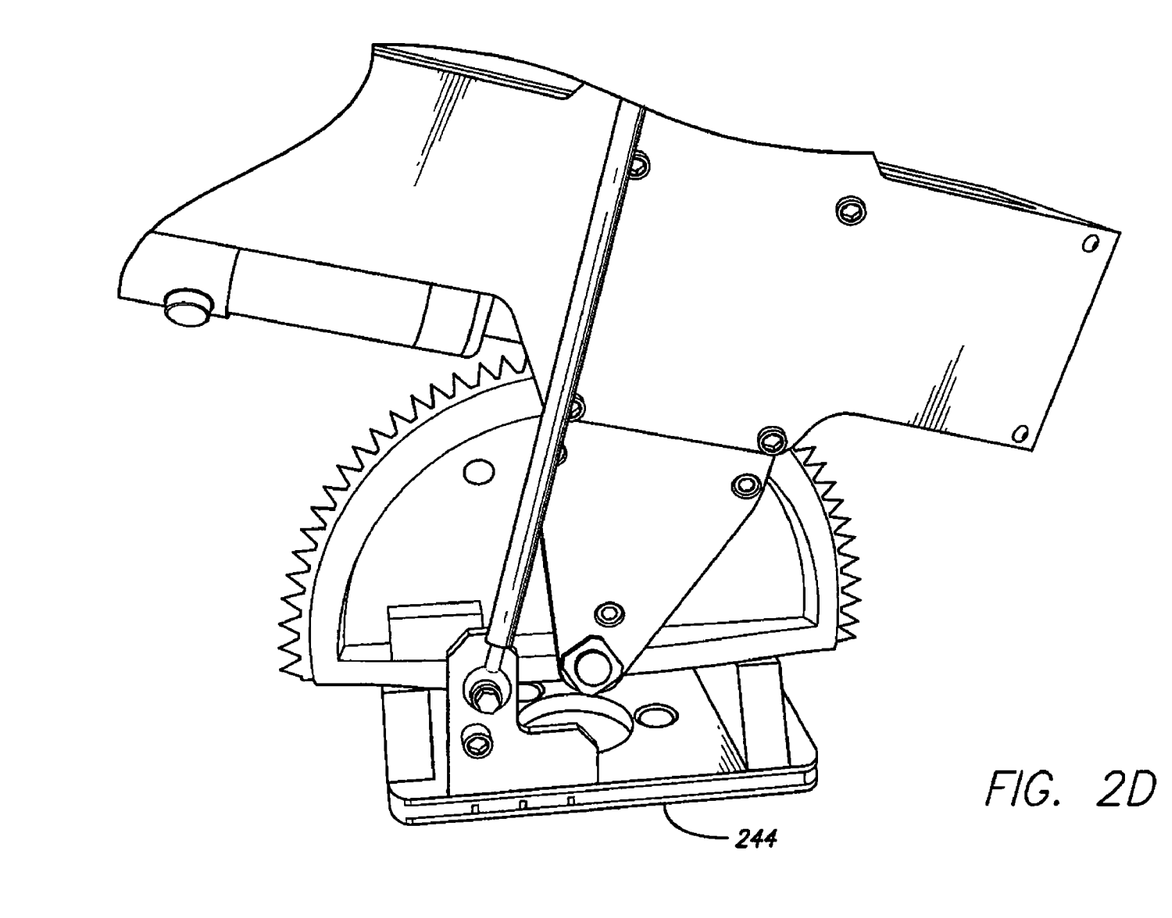
FIG. 2d illustrates an exemplary bottom mounting plate according to embodiments of the invention.

FIG. 2d illustrates an exemplary bottom mounting plate 244 according to embodiments of the invention. It should be understood that the pattern in bottom mounting plate 244 as shown in FIG. 2c is merely exemplary, and can be machined or otherwise formed in any shape to match the mounting patterns of other devices such as remote camera heads. In addition, bottom mounting plate 244 can also be a frame or plate that allows a variety of different adapter plates, each designed for a different device, to be attached to the frame.

Figure 2E:
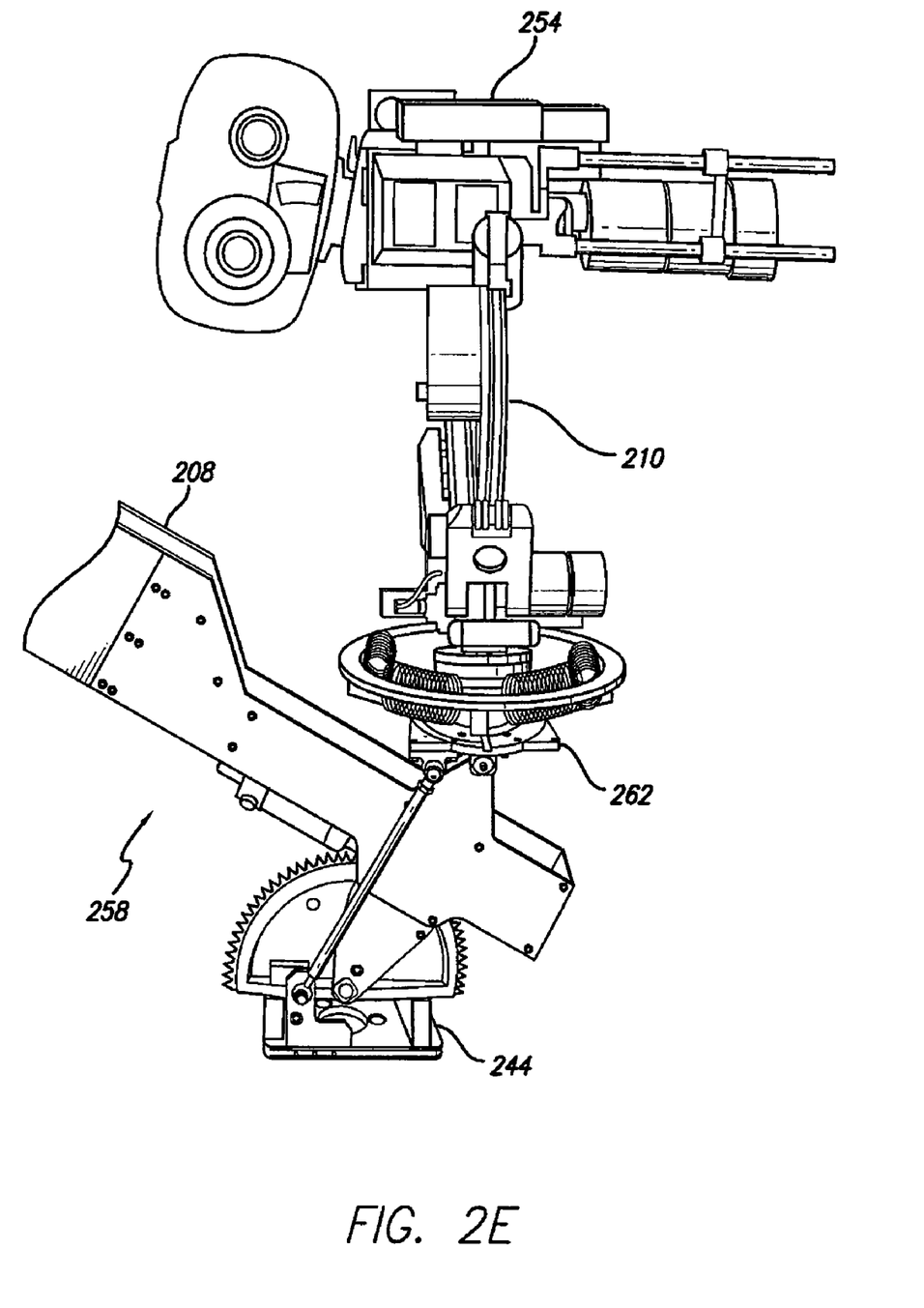
FIGS. 2e and 2f illustrate an exemplary multi-mount attached to a distal end of a crane arm and having a remote head attached to a top mounting plate and a camera mounted to the remote head according to embodiments of the invention.
Figure 2F:
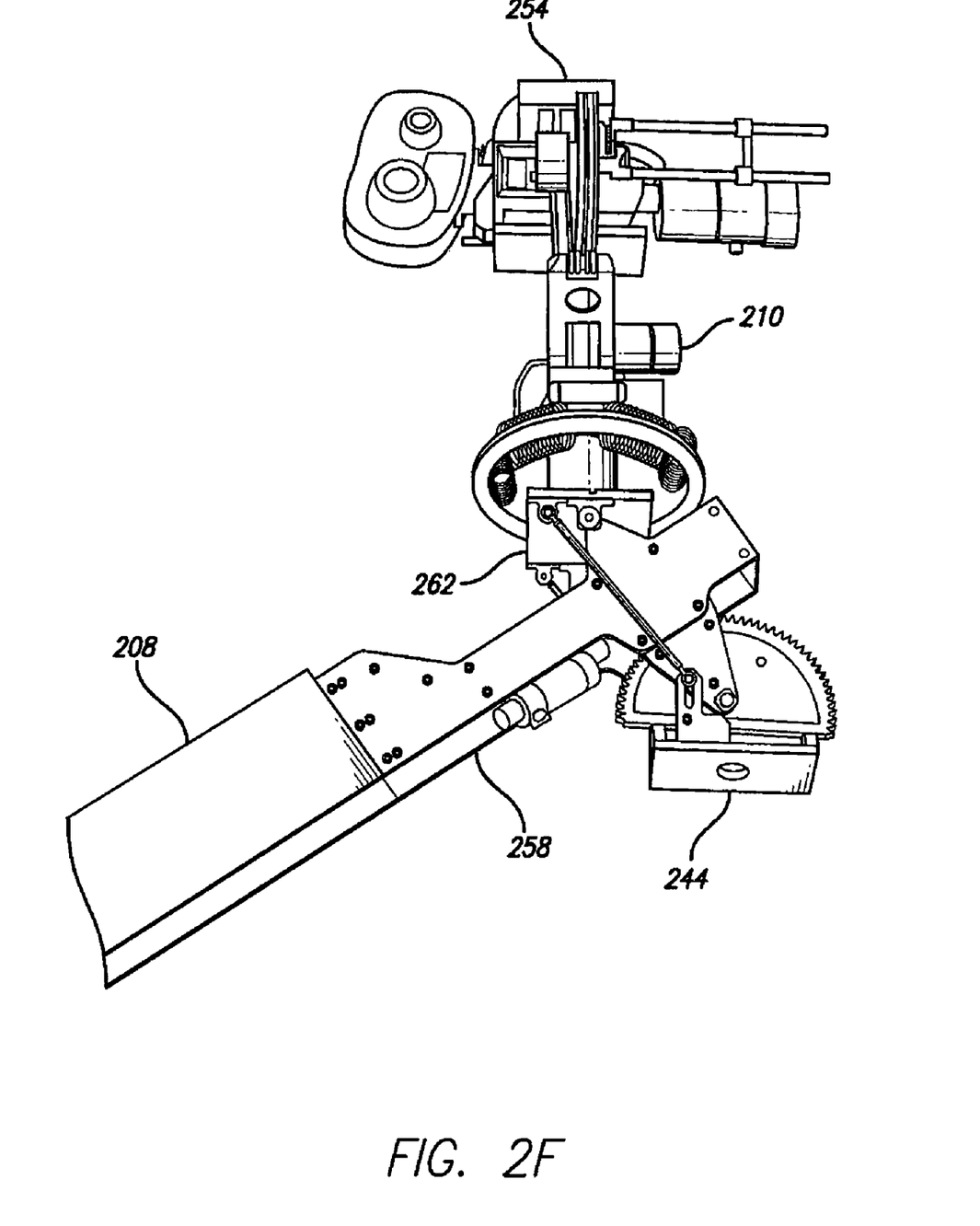

FIGS. 2e and 2f illustrate exemplary multi-mount 258 attached to a distal end of crane arm 208 and having remote head 210 attached to top mounting plate 262, and camera 254 mounted to remote head 210 according to embodiments of the invention. In FIG. 2e, crane arm 208 is pointed downward, but multi-mount 258 maintains top mounting plate 262 and bottom mounting plate 244 in a level orientation. In FIG. 2f, crane arm 210 is pointed upward, but again multi-mount 258 maintains top mounting plate 262 and bottom mounting plate 244 in a level orientation.

Figure 2G:
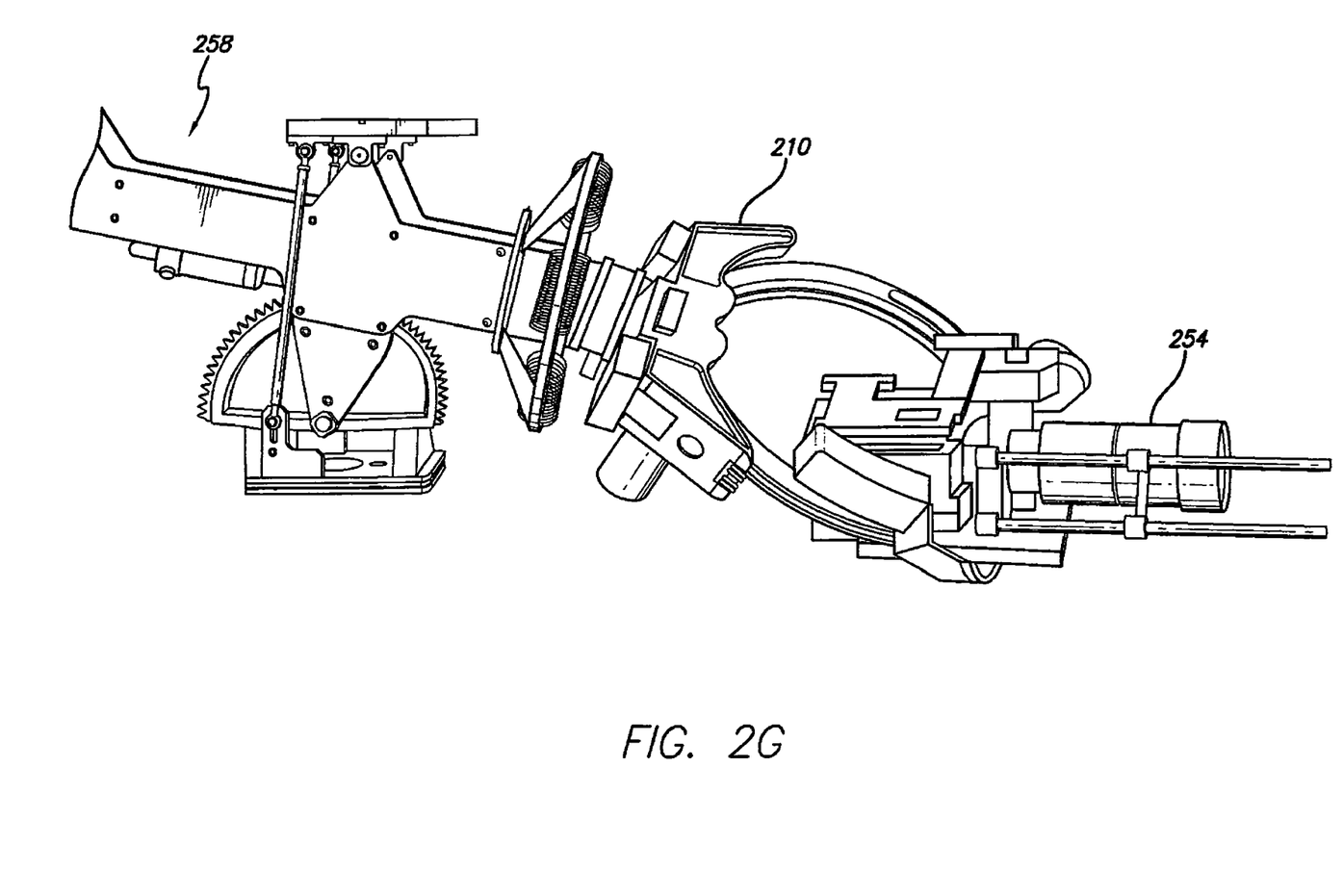
FIG. 2g illustrates an exemplary multi-mount having a remote head attached to a front mounting plate and a camera mounted to the remote head according to embodiments of the invention.

FIG. 2g illustrates exemplary multi-mount 258 having remote head 210 attached to front mounting plate 278 and camera 254 mounted to remote head 210 according to embodiments of the invention. In FIG. 2g, because front mounting plate 278 is aligned with the direction of crane arm 208, the front mounting plate is not maintained in a level orientation, but is pointed slightly downward in alignment with the crane arm.

Figure 2H:
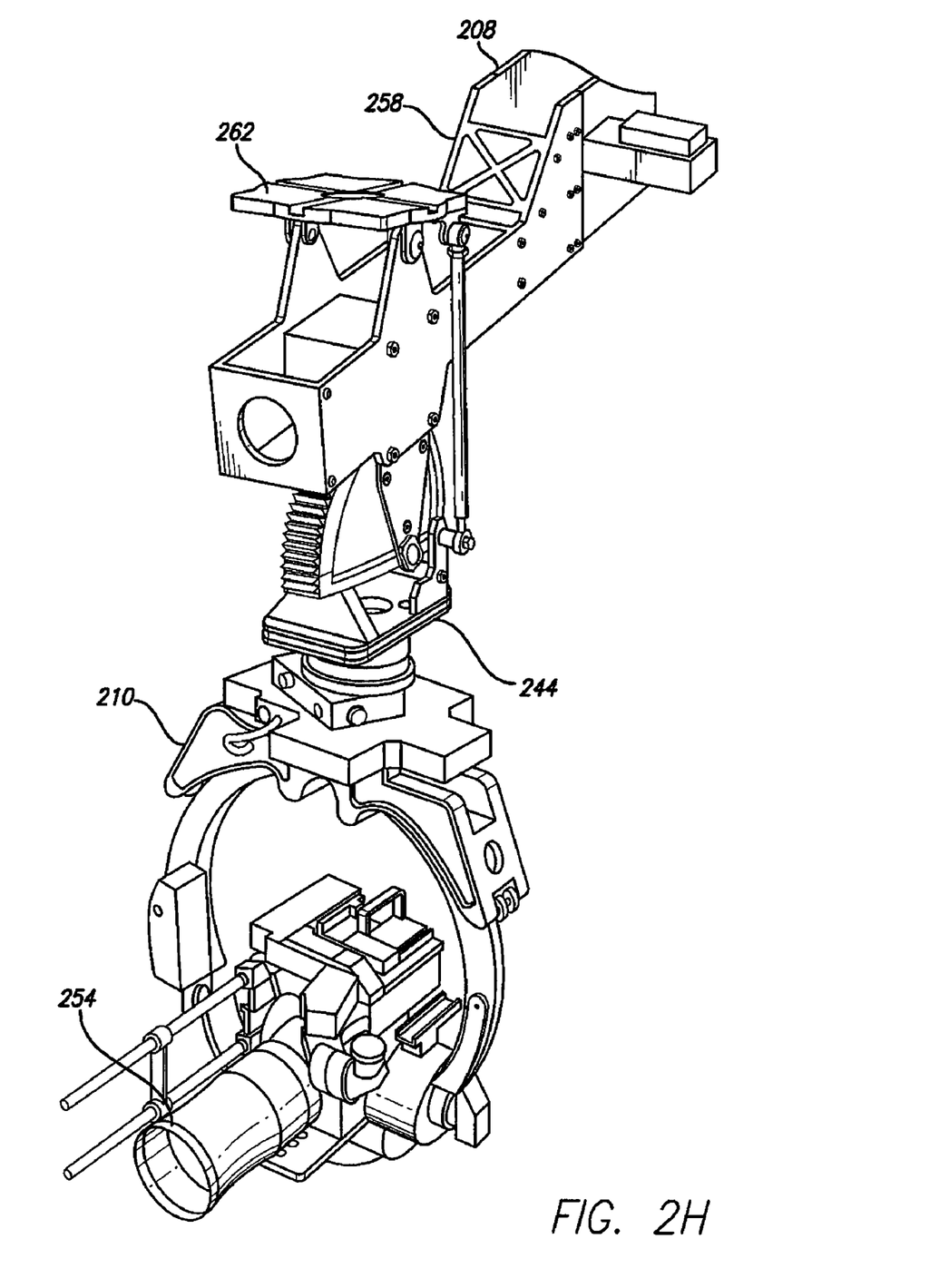
FIG. 2h illustrates an exemplary multi-mount attached to a distal end of a crane arm and having a remote head attached to a bottom mounting plate, and a camera mounted to the remote head according to embodiments of the invention.

FIG. 2h illustrates exemplary multi-mount 258 attached to a distal end of crane arm 208 and having remote head 210 attached to bottom mounting plate 244, and camera 254 mounted to remote head 210 according to embodiments of the invention. In FIG. 2h, crane arm 208 is pointed downward, but multi-mount 258 maintains top mounting plate 262 and bottom mounting plate 244 in a level orientation.

Figure 3:
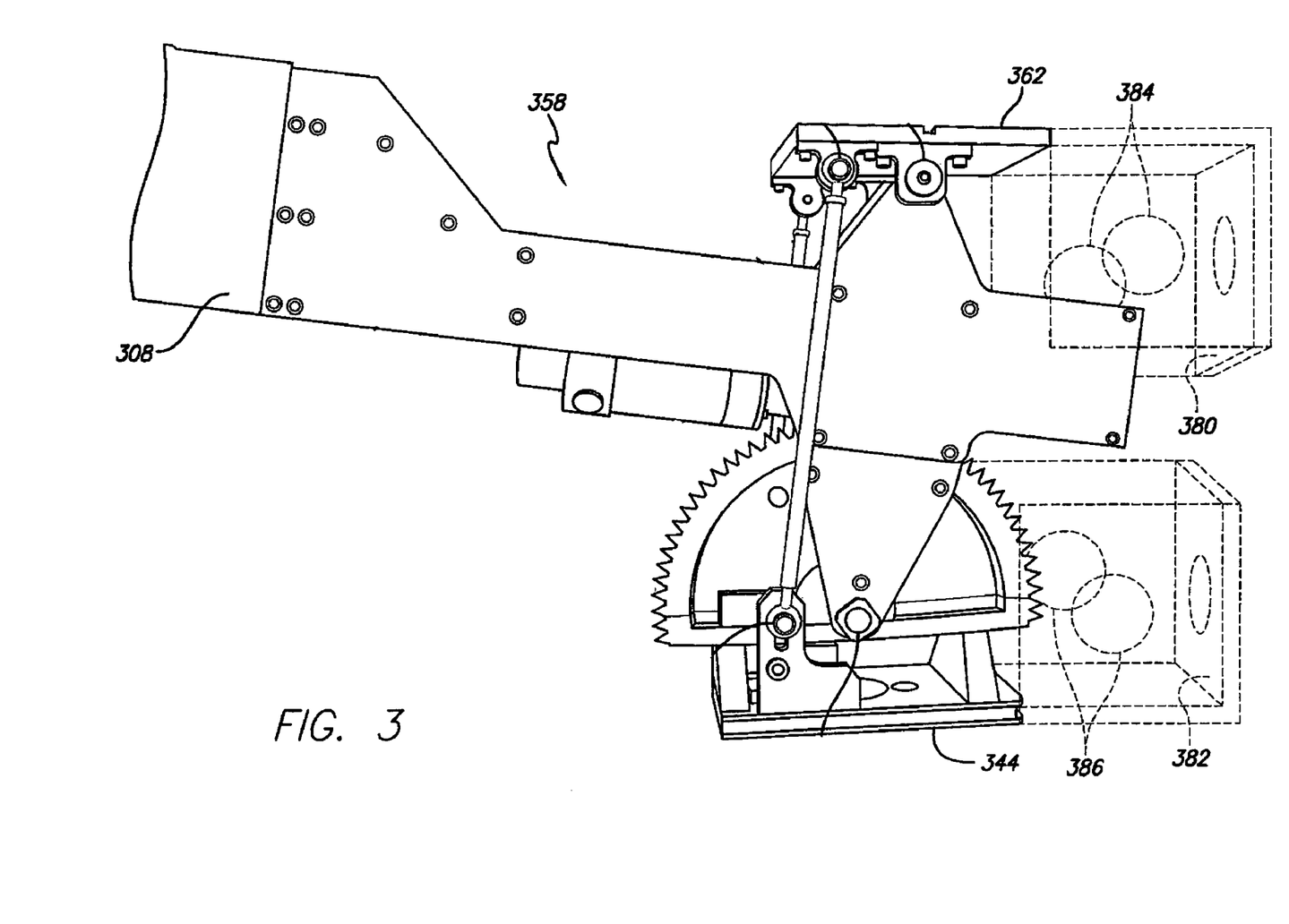
FIG. 3 illustrates another exemplary camera multi-mount according to embodiments of the invention.

FIG. 3 illustrates another exemplary camera multi-mount 358 according to embodiments of the invention. Multi-mount 358 is similar to the multi-mount shown in FIG. 2a, except that either or both of top mounting plate 362 or bottom mounting plate 344 can include an extension. Top mounting plate 362 can include an extension that forms one or more of upper front mounting plate 380 or upper side mounting plates (identified in FIG. 3 by openings 384 for clarity). Bottom mounting plate 344 can include an extension that forms one or more of lower front mounting plate 382 or lower side mounting plates (identified in FIG. 3 by openings 386 for clarity). Note that additional support structure not shown in FIG. 3 may be needed to strengthen the extensions. The extension may be attachable to the top and bottom mounting plates, or may be integrally formed with the top and bottom mounting plates. With the extensions shown in FIG. 3, both upper front mounting plate 380 and lower front mounting plate 382 remain perpendicular to top mounting plate 362 and lower mounting plate 344 (e.g. vertical) regardless of the orientation of crane arm 308. This is in contrast to the front mounting plate of FIG. 2a, which always follows the orientation of the crane arm.

With multi-mount 358 as shown in FIG. 3, a device such as a camera head can be moved quickly between top, bottom, front or side mount configurations using any of the available mounting plates. Alternatively, multiple devices such as two camera heads, or a camera head and a light, can be simultaneously attached and maintained in a known orientation.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A multi-mount apparatus for a crane arm, comprising:
first and second side plates configured for mounting to a distal end of the crane arm;
a top mounting plate pivotally coupled to the first and second side plates and configured to couple to cinematographic camera equipment;
a bottom mounting plate pivotally coupled to the first and second side plates and configured to couple to cinematographic camera equipment; and
a leveling head coupled to the first and second side plates, the leveling head cooperating with one or more linear translation members rotatably coupled to the top and bottom mounting plates for maintaining both the top and bottom mounting plates at the same orientation relative to each other, the one or more linear translation members rotatably coupled to the top and bottom mounting plates so that the orientation of at least one of said one or more linear translation members is rotatable with respect to the orientations of the top and bottom mounting plates.

2. The multi-mount apparatus of claim 1, the leveling head comprising a motor coupled to and rotatably engaged with a moon gear, the moon gear rotatably coupled to the first and second side plates and the one or more linear translation members.

3. The multi-mount apparatus of claim 1, the leveling head and linear translation member comprising a motor rotatably engaged with a ball screw assembly, the ball screw assembly coupled to the first and second side plates and the top and bottom mounting plates.

4. The multi-mount apparatus of claim 1, the leveling head and linear translation member comprising a motor rotatably engaged with a rack and pinion assembly, the rack and pinion assembly coupled to the first and second side plates and the top and bottom mounting plates.

5. The multi-mount apparatus of claim 1, further comprising a front mounting plate coupled at a distal end of the first and second side plates.

6. The multi-mount apparatus of claim 1, the leveling head configured for receiving control signals and maintaining both the top and bottom mounting plates at a level orientation.

7. The multi-mount apparatus of claim 1, one or both of the top and bottom mounting plates configured for coupling to a plurality of adapter plates, each adapter plate designed to accommodate a particular piece of cinematographic equipment.

8. The multi-mount apparatus of claim 1, one or both of the top and bottom mounting plates further including an extension member, the extension member providing one or more of a front mounting plate and side mounting plates, the front mounting plate and the side mounting plates maintained in a particular orientation with respect to the top or bottom mounting plate.

9. A method for providing multiple mounting surfaces at a distal end of a crane arm, comprising:
affixing top and bottom mounting plates to the distal end of the crane arm, each mounting plate configured to couple to cinematographic equipment, one or more linear translation members being rotatably coupled to the top and bottom mounting plates for maintaining the top and bottom plates at the same orientation relative to each other, the one or more linear translation members rotatably coupled to the top and bottom mounting plates so that the orientation of at least one of said one or more linear translation members is rotatable with respect to the orientations of the top and bottom mounting plates.

10. The method of claim 9, further comprising utilizing a leveling head cooperating with the one or more linear translation members to maintain the top and bottom plates at the same orientation relative to each other.

11. The method of claim 10, further comprising receiving control signals to maintain the top and bottom plates at a desired orientation.

12. The method of claim 10, further comprising coupling the one or more linear translation members between the leveling head and the top and bottom plates to maintain the top and bottom plates at approximately the same orientation.

13. The method of claim 10, further comprising utilizing a ball screw assembly to actuate the orientation of the top and bottom plates.

14. The method of claim 10, further comprising utilizing a rack and pinion assembly to actuate the orientation of the top and bottom plates.

15. The method of claim 9, further comprising rotatably coupling the top and bottom mounting plates to first and second side plates of a multi-mount bracket.

16. The method of claim 9, further comprising coupling the top and bottom mounting plates to a plurality of adapter plates, each adapter plate designed to accommodate a particular piece of cinematographic equipment.

17. The method of claim 9, further comprising attaching an extension member providing one or more of a front mounting plate and side mounting plates, and top and bottom plates.

18. A camera mount for a crane arm comprising:
- a camera mount support configured to couple to a distal end of the crane arm;
- a first mounting plate pivotally coupled to the camera mount support and configured to couple to cinematographic camera equipment;
- a second mounting plate pivotally coupled to the camera mount support, on an opposite side of the camera mount support from the first mounting plate, and configured to couple to cinematographic equipment;
- a linking arm pivotally coupled to each of the first and second mounting plates, the linking arm configured to maintain the first and second mounting plates in a parallel orientation with respect to each other; and
- a leveling head coupled to one or more of the first mounting plate, the second mounting plate, and the linking arm and configured to maintain the first and second mounting plates at a predetermined orientation as the crane arm changes a boom orientation.

* * * * *